US012674040B2

(12) United States Patent
Kimoto et al.

(10) Patent No.: US 12,674,040 B2
(45) Date of Patent: Jul. 7, 2026

(54) NANODIAMOND DISPERSION COMPOSITION

(71) Applicant: DAICEL CORPORATION, Osaka (JP)

(72) Inventors: Norihiro Kimoto, Tokyo (JP); Kouichi Umemoto, Tokyo (JP); Takeru Kashiwagi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 533 days.

(21) Appl. No.: 18/034,590

(22) PCT Filed: Oct. 6, 2021

(86) PCT No.: PCT/JP2021/036987

§ 371 (c)(1),
(2) Date: Apr. 28, 2023

(87) PCT Pub. No.: WO2022/091725

PCT Pub. Date: May 5, 2022

(65) Prior Publication Data

US 2023/0331959 A1 Oct. 19, 2023

(30) Foreign Application Priority Data

Oct. 30, 2020 (JP) ................................ 2020-182785

(51) Int. Cl.

*C08K 7/18* (2006.01)
*C08K 5/101* (2006.01)
*C08K 9/04* (2006.01)

(52) U.S. Cl.

CPC ................ *C08K 7/18* (2013.01); *C08K 5/101* (2013.01); *C08K 9/04* (2013.01); *C08K 2201/005* (2013.01); *C08K 2201/011* (2013.01)

(58) Field of Classification Search

None
See application file for complete search history.

(56) References Cited

U.S. PATENT DOCUMENTS

| | | | | |
|---|---|---|---|---|
| 11,167,993 | B2 | 11/2021 | Umemoto | |
| 2008/0248979 | A1 | 10/2008 | Nakagawa et al. | |
| 2011/0059876 | A1 * | 3/2011 | Takahama | C10M 173/02 977/773 |
| 2022/0259048 | A1 | 8/2022 | Kimoto et al. | |

FOREIGN PATENT DOCUMENTS

| | | | | |
|---|---|---|---|---|
| JP | 2005-1983 | A | 1/2005 | |
| JP | 2008-241443 | A | 9/2006 | |
| JP | 2008-179738 | A | 8/2008 | |
| JP | 2008-303104 | A | 12/2008 | |
| JP | 2010-126669 | A | 6/2010 | |
| JP | 2010-202458 | A | 9/2010 | |
| JP | 2013-117016 | A | 6/2013 | |
| JP | 2020-132447 | A | 8/2020 | |
| KR | 10-2015-0015244 | A | 2/2015 | |
| WO | WO 2009/128258 | A1 | 10/2009 | |
| WO | WO 2018/235599 | A1 | 12/2018 | |
| WO | WO-2020054337 | A1 * | 3/2020 | C10M 169/04 |
| WO | WO 2020/241404 | A1 | 12/2020 | |

OTHER PUBLICATIONS

WO 2020054337 Eng Trans (Year: 2020).*
Chinese Office Action and Search Report for Chinese Application No. 202180072921.7, dated May 27, 2025, with English translation.
International Preliminary Report on Patentability and Written Opinion of the International Searching Authority for International Application No. PCT/JP2021/036987, dated May 2, 2023 with an English translation.
International Search Report for International Application No. PCT/JP2021/036987, dated Dec. 14, 2021, with an English translation.
Krueger et al., "Deagglomeration and Functionalisation of Detonation Nanodiamond With Long Alkyl Chains", Diamond & Related Materials, vol. 17, 2008, pp. 1367-1370.
Extended European Search Report for European Application No. 21885844.7, dated Jan. 2, 2026.

* cited by examiner

*Primary Examiner* — Jeffrey D Washville

(74) *Attorney, Agent, or Firm* — Birch, Stewart, Kolasch & Birch, LLP

(57) ABSTRACT

Provided is a nanodiamond dispersion composition having excellent dispersibility of nanodiamond particles in an organic dispersion medium. A nanodiamond dispersion composition including an organic dispersion medium, nanodiamond particles dispersed in the organic dispersion medium, and a fatty acid ester dispersing agent, the nanodiamond particles being surface-modified by a surface-modifying group or compound containing an organic group. The fatty acid ester dispersing agent preferably has a mass loss rate of 30% or less when held in an air atmosphere at a temperature of 200° C. for 180 minutes.

20 Claims, No Drawings

NANODIAMOND DISPERSION COMPOSITION

TECHNICAL FIELD

The present disclosure relates to a nanodiamond dispersion composition. More specifically, the present disclosure relates to a composition in which nanodiamond particles are dispersed in an organic dispersion medium. The present application claims priority to JP 2020-182785 filed in Japan on Oct. 30, 2020, the contents of which are incorporated herein by reference.

BACKGROUND ART

Nano-sized fine substances are known to have novel characteristics that cannot be achieved in a bulk state. For example, nanodiamond particles (i.e., nano-sized diamond particles) exhibit mechanical strength, a high refractive index, thermal conductivity, insulating properties, antioxidation properties, and an action of promoting the crystallization of resins and the like. Techniques relating to the production of such nanodiamonds are described, for example, in Patent Documents 1 and 2 listed below.

However, nanodiamond particles typically have large proportions of surface atoms, a sum of van der Waals forces that can act between surface atoms of adjacent particles is strong, and aggregation tends to occur. In addition, in the case of nanodiamond particles, Coulomb interaction between crystalline surfaces of adjacent crystals may contribute to agglutination, which is a phenomenon where particles form a significantly firm cluster. Thus, it has been extremely difficult to disperse nanodiamond particles as primary particles in an organic solvent.

Patent Documents 3 and 4 describe lubricating oil compositions containing nanodiamond particles and a specific additive.

CITATION LIST

Patent Document

Patent Document 1: JP 2005-001983 A
Patent Document 2: JP 2010-126669 A
Patent Document 3: JP 2006-241443 A
Patent Document 4: JP 2008-179738 A

SUMMARY OF INVENTION

Technical Problem

However, for Patent Documents 3 and 4, both the lubricating oil compositions, which are said to have excellent dispersibility of nanodiamond particles, have small contents of nanodiamond particles. For example, in Patent Document 3, to disperse the nanodiamond particles in the composition, a dispersion solvent, such as ethanol or DMSO, is contained in an amount that is 10 times an amount of nanodiamond particles. Thus, when it is attempted to blend a large amount of nanodiamond particles in a lubricant composition of Patent Document 3, also because the used amount of the dispersion solvent is larger, practical use as a lubricating oil composition is difficult.

Furthermore, in Patent Document 4, to form a composition having excellent dispersibility, a dispersing agent in an amount that is 200 times an amount of nanodiamond particles needs to be blended. Thus, in Patent Document 4, when it is attempted to blend a large amount of nanodiamond particles, an amount of the dispersing agent also is large and exceeds an amount of an additive, and thus the dispersing agent cannot be blended as an additive. Thus, a dispersion composition having even better dispersibility of nanodiamond particles has been demanded.

Therefore, an object of the present disclosure is to provide a nanodiamond dispersion composition having excellent dispersibility of nanodiamond particles in an organic dispersion medium.

Solution to Problem

As a result of diligent research to achieve the above object, the inventors of the present disclosure discovered that a nanodiamond dispersion composition having excellent dispersibility of nanodiamond particles in an organic dispersion medium can be obtained by using a specific dispersing agent. The present disclosure relates to inventions completed based on these findings.

That is, the present disclosure provides a nanodiamond dispersion composition including an organic dispersion medium, nanodiamond particles dispersed in the organic dispersion medium, and a fatty acid ester dispersing agent, the nanodiamond particles being surface-modified by a surface-modifying group or compound containing an organic group.

A content ratio of the nanodiamond particles may be greater than 3.0 mass %.

The fatty acid ester dispersing agent preferably has a mass loss rate of 30% or less when held in an air atmosphere at a temperature of 200° C. for 180 minutes.

The fatty acid ester dispersing agent preferably has an acid value of 40 mgKOH/g or less.

The nanodiamond particles preferably has an average dispersed particle size from 2 to 240 nm.

The nanodiamond dispersion composition preferably has a haze value of 5 or less.

The organic dispersion medium preferably has an SP value from 6.0 to 12.0 $(cal/cm^3)^{1/2}$.

The nanodiamond dispersion composition preferably has a viscosity at 25° C. from 0.2 to 120 mPa·s.

The fatty acid ester dispersing agent preferably has an average molecular weight Mp of 300 or greater.

The nanodiamond particle preferably includes a surface-modified nanodiamond in which a surface of a nanodiamond particle is modified by a group represented by Formula (I) below:

$$—X—R \quad (I)$$

where X represents —Si—, —NH—, —O—, —O—C(═O)—, —C(═O)—O—, —NH—C(═O)—, —C(═O)—NH—, or —S—, and the bond extending to the left from X binds to the nanodiamond particle, and R represents a monovalent organic group, and an atom that binds to X is a carbon atom.

In Formula (I) above, X preferably represents —Si—, —NH—, —O—, or —O—C(═O)—.

Advantageous Effects of Invention

The nanodiamond dispersion composition according to the present disclosure has excellent dispersibility of nanodiamond particles in an organic dispersion medium. In particular, the nanodiamond dispersion composition has excellent dispersibility of nanodiamond particles in an organic dispersion medium even when the content of the nanodiamond particles is large. In addition, a fatty acid ester dispersing agents have high heat resistance, and the nanodiamond dispersion composition according to the present disclosure tends to exhibit excellent dispersion stability in a high temperature environment.

DESCRIPTION OF EMBODIMENTS

The nanodiamond dispersion composition (ND dispersion composition) according to the present disclosure includes at least an organic dispersion medium, nanodiamond particles (ND particles) dispersed in the organic dispersion medium, and a fatty acid ester dispersing agent.

An average dispersed particle size (D50, median diameter) of the ND particles in the ND dispersion composition is preferably from 2 to 240 nm, more preferably from 4 to 200 nm, even more preferably from 5 to 100 nm, yet even more preferably from 10 to 70 nm, and particularly preferably from 12 to 40 nm. The average dispersed particle size can be measured using a dynamic light scattering method, The ND dispersion composition has excellent dispersibility of ND particles, thus making it possible to disperse the ND particles in the organic dispersion medium at an average dispersed particle size within such a range.

A content ratio of the ND particles in the ND dispersion composition is, for example, from 0.01 to 5.0 mass %, preferably from 0.1 to 4.0 mass %, more preferably from 0.25 to 3.0 mass %, and further preferably from 0.5 to 2.0 mass %. When the content ratio of the ND particles in the ND dispersion composition is within such a range, the dispersibility of ND particles is superior. Furthermore, the content ratio may be greater than 3.0 mass %, or 3.5 mass % or greater. Since the ND dispersion composition has excellent dispersibility of ND particles, even when the content ratio is greater than 3 mass %, the ND particles can be dispersed in a small dispersed particle size while the addition amount of the dispersing agent is suppressed. From the viewpoint of achieving excellent dispersibility of the ND particles, the content ratio is preferably 10 mass % or less. Note that the ND dispersion composition may be a concentrated liquid that is to be diluted at the time of use to lower the content ratio of the ND particles (for example, from 0.1 to 2000 mass ppm).

A content of the fatty acid ester dispersing agent in the ND dispersion composition with respect to 100 parts by mass of the total amount of the ND particles in the ND dispersion composition is, for example, from 10 to 10000 parts by mass (or parts by mass or greater and less than 10000 parts by mass), preferably from 50 to 1000 parts by mass, and more preferably from 70 to 300 parts by mass. When the content of the fatty acid ester dispersing agent is within such a range, the dispersibility of ND particles in the ND dispersion composition is superb.

A content ratio of a solvent in the ND dispersion composition is, for example, from 90 to 99.9999 mass %, or from 90 to 96.999 mass %. The rate of content of the organic dispersion medium with respect to the total amount of the solvent is, for example, not less than 60 mass %, preferably not less than 70 mass %, even more preferably not less than 80 mass %, and particularly preferably not less than 90 mass %.

The ND dispersion composition preferably has a haze value of 5 or less, more preferably 3 or less, even more preferably 1 or less, yet even more preferably 0.5 or less, yet even more preferably 0.1 or less, and particularly preferably 0.05 or less. The ND dispersion composition has excellent dispersibility of ND particles, thus making it possible to obtain an ND dispersion composition having such a haze value. The haze value can be measured based on JIS K 7136. Furthermore, the haze value of the ND dispersion composition having the ND concentration of 0.1 mass % may be in the range described above.

A viscosity at 25° C. of the ND dispersion composition is preferably from 0.2 to 120 mPa·s, more preferably from 10 to 100 mPa·s, and even more preferably from 20 to 90 mPa·s. The ND dispersion composition has excellent dispersibility of ND particles, and thus the dispersibility in the organic dispersion medium is excellent even when the viscosity is within such a range. A rotor and a rotational speed of the rotor at the time of measuring the viscosity are selected as appropriate based on the measured values. The viscosity can be measured using, for example, an EMS viscometer (trade name "EMS 1000", available from Kyoto Electronics Co., Ltd.).

The ND dispersion composition may include only the ND particles, the fatty acid ester dispersing agent, and the organic dispersion medium, or may contain an additional component. Examples of the additional component include a dispersing agent that is not a fatty acid ester dispersing agent, a surfactant, a thickener, a coupling agent, a rust inhibitor, a corrosion inhibitor, a freezing point depressant, an anti-foaming agent, an anti-wear additive, an antiseptic, and a colorant. Note that a content ratio of the fatty acid ester dispersing agent with respect to the total amount of dispersing agent in the ND dispersion composition is preferably 90 mass % or greater, more preferably 95 mass % or greater, and even more preferably 99 mass % or greater. A content ratio of the additional component with respect to the total amount of the ND dispersion composition is, for example, 30 mass % or less, preferably 20 mass % or less, more preferably 10 mass % or less, even more preferably 5 mass % or less, yet even more preferably 1 mass % or less, and particularly preferably less than 1 mass %. Accordingly, a total content ratio of the ND particles, the fatty acid ester dispersing agent, and the organic dispersion medium with respect to the total amount of the ND dispersion composition is, for example, 70 mass % or greater, preferably 80 mass % or greater, more preferably 90 mass % or greater, even more preferably 95 mass % or greater, yet even more preferably 99 mass % or greater, and particularly preferably greater than 99 mass %. In particular, the content ratio of a surfactant as the additional component is preferably in a range exemplified as the content ratio of the additional component described above.

Nanodiamond Particles

The ND particles are not particularly limited, and known or commonly used nanodiamond particles can be used. The ND particles may be ND particles surface-modified (a surface-modified ND particle) or may be ND particles not surface-modified. Note that ND particles that have not been surface-modified have hydroxyl groups (—OH) or carboxy groups (—COOH) on the surfaces. Only one type, or two or more types of ND particles may be used.

Examples of a compound or a functional group that surface modifies ND particles in the surface-modified ND include a silane compound, a phosphonate ion or phosphonic acid residue, a surface-modifying group having a vinyl group at a terminal, an amide group, a cation of a cationic surfactant, a group containing a polyglycerin chain, and a group containing a polyethylene glycol chain.

The compound or the functional group that surface modifies ND particles in the surface-modified ND preferably includes an organic group. The organic group is more preferably an organic group having 4 or more (for example, from 4 to 25) carbons, more preferably an organic group having 6 or more (for example, from 6 to 22) carbons, and particularly preferably an organic group having 8 (for example, from 8 to 20) or more carbons. When the surface-modifying compound or the surface-modifying functional group includes an organic group (in particular, an organic group having 4 or more carbons), the hydrophobic interaction between the organic group and the organic dispersion medium further improves the dispersibility of the ND particles in the organic dispersion medium. Examples of the organic group include a substituted or unsubstituted hydrocarbon group, a substituted or unsubstituted heterocyclic group, and a group in which two or more of the aforementioned hydrocarbon group and/or the aforementioned heterocyclic group are bonded. Specific examples of the organic group include organic groups of the monovalent organic groups exemplified and described as R in Formula (I) described below.

Of these, from the viewpoint of further improving dispersibility in the organic dispersion medium by being combined with the fatty acid ester dispersing agent, the compound or the functional group that surface modifies ND particles in the surface-modified ND is preferably a group represented by Formula (I) below. That is, the surface-modified ND is preferably a surface-modified ND in which a surface of a nanodiamond particle is modified by a group represented by Formula (I) below.

$$—X—R \quad (I)$$

wherein X represents —Si—, —NH—, —O—, —O—C(═O)—, —C(═O)—O—, —NH—C(═O)—, —C(═O)—NH—, or —S—, and the bond extending to the left from X binds to the nanodiamond particle. R represents a monovalent organic group, and an atom that binds to X is a carbon atom.

Examples of the monovalent organic group of R include a substituted or unsubstituted hydrocarbon group (a monovalent hydrocarbon group), a substituted or unsubstituted heterocyclic group (a monovalent heterocyclic group), and a group in which two or more of the aforementioned monovalent hydrocarbon group and/or the aforementioned monovalent heterocyclic group are bonded. The bonded groups may be directly bonded or may be bonded via a linking group. Examples of the linking group include an amino group, an ether bond, an ester bond, a phosphinic acid group, a sulfide bond, a carbonyl group, an organic group-substituted amide group, an organic group-substituted urethane bond, an organic group-substituted imide bond, a thiocarbonyl group, a siloxane bond, and a group in which two or more of those listed above are bonded.

Examples of the hydrocarbon group of the monovalent organic group include, for example, an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a $C_{1-22}$ alkyl group, such as a methyl group, an ethyl group, a propyl group, an isopropyl group, a butyl group, a hexyl group, an octyl group, an isooctyl group, a decyl group, and a dodecyl group (preferably a $C_{2-20}$ alkyl group, and more preferably a $C_{3-18}$ alkyl group). Examples of the alkenyl group include a $C_{2-22}$ alkenyl group, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, a 5-hexenyl group, and an oleyl group (preferably a $C_{4-20}$ alkenyl group, and more preferably a $C_{8-18}$ alkenyl group). Examples of the alkynyl group include a $C_{2-22}$ alkynyl group, such as an ethynyl group and a propynyl group (preferably a $C_{4-20}$ alkynyl group, and more preferably a $C_{8-18}$ alkynyl group).

Examples of the alicyclic hydrocarbon group include: a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Examples of the heterocycle forming the above heterocyclic group include an aromatic heterocycle and a non-aromatic heterocycle. Examples of such a heterocycle include a 3 to 10-membered ring (preferably a 4 to 6-membered ring) having a carbon atom and at least one heteroatom (e.g., oxygen atom, sulfur atom, and nitrogen atom) as atoms constituting the ring, and a condensed ring thereof. Specific examples thereof include heterocycles containing an oxygen atom as a heteroatom (e.g., 3-membered rings, such as an oxirane ring; 4-membered rings, such as an oxetane ring; 5-membered rings, such as a furan ring, a tetrahydrofuran ring, an oxazole ring, an isoxazole ring, and a γ-butyrolactone ring; 6-membered rings, such as a 4-oxo-4H-pyran ring, a tetrahydropyran ring, and a morpholine ring; condensed rings, such as a benzofuran ring, an isobenzofuran ring, a 4-oxo-4H-chromene ring, a chroman ring, and an isochroman ring; crosslinked rings, such as a 3-oxatricyclo[4.3.1.1$^{4,8}$] undecan-2-one ring and a 3-oxatricyclo[4.2.1.0$^{4,8}$] nonan-2-one ring), heterocycles containing a sulfur atom as a heteroatom (e.g., 5-membered rings, such as a thiophene ring, a thiazole ring, an isothiazole ring, and a thiadiazole ring; and 6-membered rings, such as a 4-oxo-4H-thiopyran ring; condensed rings, such as a benzothiophene ring), and heterocycles containing a nitrogen atom as a heteroatom (e.g., 5-membered rings, such as a pyrrole ring, a pyrrolidine ring, a pyrazole ring, an imidazole ring, and a triazole ring; 6-membered rings, such as an isocyanuric ring, a pyridine ring, a pyridazine ring, a pyrimidine ring, a pyrazine ring, a piperidine ring, and a piperazine ring; condensed rings, such as an indole ring, an indoline ring, a quinoline ring, an acridine ring, a naphthyridine ring, a quinazoline ring, and a purine ring).

Furthermore, examples of the group in which an aliphatic hydrocarbon group and an alicyclic hydrocarbon group are bonded include a cyclohexylmethyl group and a methylcyclohexyl group. Examples of the group in which an aliphatic hydrocarbon group and an aromatic hydrocarbon group are bonded include a $C_{7-18}$ aralkyl group (especially, a $C_{7-10}$ aralkyl group), such as a benzyl group and a phenethyl group; a $C_{6-10}$-aryl-$C_{2-6}$ alkenyl group, such as a cinnamyl group; a $C_{1-4}$ alkyl-substituted aryl group, such as a tolyl group; and a $C_{2-4}$ alkenyl-substituted aryl group, such as a styryl group.

Examples of the group in which two or more of the monovalent hydrocarbon group and/or the monovalent heterocyclic group are bonded via a linking group include a group in which the monovalent hydrocarbon group and/or the monovalent heterocyclic group is bonded to an alkoxy group, an alkenyloxy group, an alkynyloxy group, an aryloxy group, an aralkyloxy group, an acyloxy group, an alkylthio group, an alkenylthio group, an arylthio group, an aralkylthio group, an acyl group, an alkenylcarbonyl group, an arylcarbonyl group, an aralkylcarbonyl group, an alkoxycarbonyl group, an alkenyloxycarbonyl group, an aryloxycarbonyl group, an aralkyloxycarbonyl group, a dialkylamino group, an acylamino group, an oxetanyl group-containing group, or a carbamoyl group; or a group in which the monovalent hydrocarbon group and/or the monovalent heterocyclic group is bonded to two or more of the groups listed above.

The monovalent organic group may have a substituent. Examples of the substituent include a halogen atom, such as a fluorine atom, a chlorine atom, a bromine atom, and an iodine atom; a cyano group; an isocyanate group; and an isothiocyanate group. Furthermore, the monovalent organic group is preferably free of functional groups containing active hydrogen (such as a hydroxy group, a carboxy group, an amino group, a mono-substituted amino group, a thiol group, and a phosphate group).

The number of carbon atoms in the monovalent organic group is preferably from 4 to 25, more preferably from 6 to 22, and even more preferably from 8 to 20. When the number of carbon atoms is 4 or more, the steric hindrance between the surface-modifying groups is sufficient, and dispersion in the dispersion medium is facilitated. When the number of carbon atoms is 25 or less, the surface-modifying groups is kept from being entangled, and dispersion in the dispersion medium is facilitated.

Among these, the monovalent organic group is preferably a monovalent substituted or unsubstituted hydrocarbon group, a group in which a monovalent substituted or unsubstituted hydrocarbon group is bonded to an alkoxy group, or a group in which a monovalent substituted or unsubstituted hydrocarbon group is bonded to a dialkylamino group.

The aforementioned R preferably contains a hydrocarbon group having 4 or more consecutive carbon atoms in a straight chain. Examples of such a hydrocarbon group include a linear alkylene group, such as a tetramethylene group, a pentamethylene group, a hexamethylene group, a heptamethylene group, an octamethylene group, a nonamethylene group, and a decamethylene group; a branched alkylene group, such as a 2-ethylhexamethylene group; a linear alkenylene group, such as a 1-butenylene group, a 2-butenylene group, a 1-pentenylene group, a 2-pentenylene group, and a 3-pentenylene group; a branched alkenylene group, such as a 2-methyl-2-butenylene group; an alicyclic hydrocarbon group having 4 or more carbons, such as a cyclohexyl group; an aromatic hydrocarbon group having 6 or more carbons, such as a phenyl group; and a heterocyclic group containing a structure having 4 or more continuous carbon atoms, such as a piperidine ring.

In Formula (I), a molar ratio of carbon atoms to the total amount of heteroatoms selected from the group consisting of nitrogen atoms, oxygen atoms, sulfur atoms, and silicon atoms is preferably 4.5 or greater, more preferably 5 or greater, and even more preferably 5.5 or greater. When the molar ratio is 4.5 or greater, dispersibility in an organic solvent is superior. The molar ratio is not particularly limited but may be, for example, 22 or lower, or 20 or lower.

In particular, X in Formula (I) above is preferably —Si—, —NH—, —O—, —O—C(=O)—, or —C(=O)—O—, and more preferably —Si—, —NH—, —O—, or —O—C(=O)—. In this case, a surface-modified ND having excellent dispersibility in the organic dispersion medium can be more easily produced.

In Formula (I) above, when X is —O—, —O—C(=O)—, or —C(=O)—O—, R is preferably a monovalent substituted or unsubstituted hydrocarbon group, and more preferably a linear or branched hydrocarbon group having from 8 to 20 carbons.

In Formula (I) above, when X is —NH—, R is preferably a monovalent organic group containing from 8 to 20 carbon atoms. The monovalent organic group is preferably a substituted or unsubstituted hydrocarbon group, more preferably a substituted or unsubstituted aliphatic hydrocarbon group, and even more preferably a substituted or unsubstituted unsaturated aliphatic hydrocarbon group. Furthermore, when X is —NH—, R is preferably a monovalent organic group containing a hydrocarbon group having 4 or more carbon atoms in a straight chain.

In Formula (I) above, when X is —Si—, two bonds are further present in the silicon atom in addition to the bond that binds to the nanodiamond particle and the bond that binds to R in Formula (I) above. The two bonds both or independently bind to, via an oxygen atom, a hydrogen atom, an aliphatic hydrocarbon group having from 1 to 3 carbons, a silicon atom in another group represented by Formula (I) above, a silicon atom in a silane compound as described below, or a nanodiamond particle. Specifically, the two bonds both or independently bind to $OR^1$ as described below, $OR^2$ as described below, or a nanodiamond particle.

In Formula (I) above, when X is —Si—, the surface-modified ND is preferably a surface-modified ND having a silane compound bonded to the surface. The silane compound preferably has a hydrolyzable group and an aliphatic hydrocarbon group. The silane compound used for surface modification of the ND particles may be only one type, or may be two or more types.

Among these, the silane compound preferably contains at least a compound represented by Formula (1-1) below.

[Chem. 1]

(1-1)

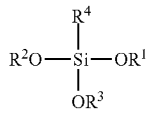

In Formula (1-1), $R^1$, $R^2$, and $R^3$ all or independently represent an aliphatic hydrocarbon group having from 1 to 3 carbons. $R^4$ represents an aliphatic hydrocarbon group having one or more carbons.

Examples of the aliphatic hydrocarbon group having from 1 to 3 carbons of $R^1$, $R^2$, and $R^3$ include linear or branched alkyl groups, such as methyl, ethyl, propyl, and isopropyl groups; linear or branched alkenyl groups, such as vinyl and allyl groups; and alkynyl groups, such as an ethynyl group and a propynyl group. Among these, a linear or branched alkyl group is preferred.

$R^4$ corresponds to R in Formula (I) above and represents a monovalent organic group. The monovalent organic group preferably is an aliphatic hydrocarbon group having one or more carbons, and examples thereof include linear or branched alkyl groups, such as methyl, ethyl, propyl, isopropyl, butyl, isobutyl, s-butyl, t-butyl, pentyl, hexyl, n-octyl, 2-ethylhexyl, nonyl, isononyl, decyl, isodecyl, lauryl, myristyl, isomyristyl, butyloctyl, isocetyl, hexyldecyl, stearyl, isostearyl, octyldecyl, octyldodecyl, and isobehenyl groups; linear or branched alkenyl groups, such as vinyl, allyl, 1-butenyl, 7-octenyl, 8-nonenyl, 9-decenyl, 11-dodecenyl, and oleyl groups; and linear or branched alkynyl groups, such as ethynyl, propynyl, decynyl, pentadecynyl, and octadecynyl groups.

Among these, from the viewpoint of providing higher lipophilicity and larger steric hindrance and thereby excelling in an aggregation suppressing effect and being able to impart higher dispersibility, $R^4$ is preferably an aliphatic hydrocarbon group having 4 or more carbons, and is particularly preferably an aliphatic hydrocarbon group having 6 or more carbons. Note that the upper limit of the number of carbons of the aliphatic hydrocarbon group is, for example, 25, and is preferably 20, and more preferably 12. Furthermore, the aliphatic hydrocarbon group is preferably a linear or branched alkyl group or alkenyl group, and is particularly preferably a linear or branched alkyl group.

When $R^4$ is an aliphatic hydrocarbon group having 4 or more carbons, affinity for the organic dispersion medium is exhibited, and a larger steric hindrance can be obtained, and thus the aggregation suppressing effect is superior. Also, the groups containing an oxygen atom ($OR^{1'}$ group and $OR^{2'}$ group in Formula (1)) exhibit affinity for the organic dispersion medium, and therefore the affinity for the organic dispersion medium is excellent, and even better dispersibility in the organic dispersion medium can be exhibited.

Therefore, examples of the ND particles surface-modified by a silane compound (silane compound surface-modified ND particles) include ND particles having a structure that has been surface modified by a group represented by Formula (1) below.

[Chem. 2]

(1)

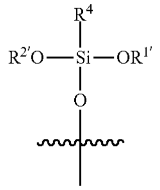

In Formula (1) above, $R^4$ corresponds to R in a group represented by Formula (1) above and represents a monovalent organic group. $R^{1'}$ and $R^{2'}$ both or independently represent a hydrogen atom, an aliphatic hydrocarbon group having from 1 to 3 carbons, or a group represented by Formula (a) below. The bond indicated by a wavy line in the formula bonds to the surface of the nanodiamond particles.

[Chem. 3]

(a)

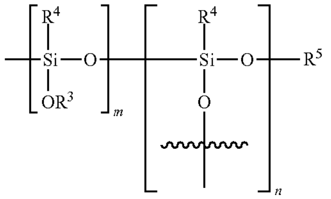

In Formula (a) above, $R^4$ corresponds to R in a group represented by Formula (1) above and represents a monovalent organic group. $R^3$ and $R^5$ both or independently represent a hydrogen atom or an aliphatic hydrocarbon group having from 1 to 3 carbons. Also, m and n may be the same or different, and each represents an integer of 0 or greater, Note that the bond extending to the left from the silicon atom bonds to an oxygen atom. In addition, the bond marked by a wavy line binds to the surface of a nanodiamond particle. $R^4$ in Formula (1) corresponds to $R^4$ in Formula (1-1).

Examples of the aliphatic hydrocarbon group having from 1 to 3 carbons of $R^{1'}$, $R^{2'}$, $R^3$, and $R^5$ in Formula (1) above include: linear or branched alkyl groups, such as methyl, ethyl, propyl, and isopropyl groups; linear or branched alkenyl groups, such as vinyl and allyl groups; and alkynyl groups, such as an ethynyl group and a propynyl group. Among these, a linear or branched alkyl group is preferred.

Further, m and n each indicate the number of constituent units shown in parentheses, and may be the same or different, and each indicates an integer of 0 or greater. In a case where m and n are each 2 or greater, the bonding of two or more constituent units may be any of random, alternating, or block.

The above silane compound surface-modified ND particles may have, in addition to a group represented by Formula (1) above, another functional group, such as a group represented by Formula (1') below or another surface functional group (for example, an amino group, a hydroxy group, and a carboxy group). The above other functional groups may be only one type or may be two or more types.

[Chem. 4]

(1')

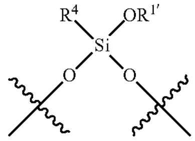

In Formula (1') above, $R^{1'}$ and $R^4$ are the same as those described above. The bond indicated by a wavy line in the formula bonds to the surface of the nanodiamond particles.

In a case where a silane compound (in particular, a compound represented by Formula (1-1) above) is used as the compound for surface treatment, in the compound, for example, the hydrolyzable alkoxysilyl groups, such as the $OR^1$ group, the $OR^2$ group, and the $OR^3$ group in Formula (1-1), are easily hydrolyzed to form silanol groups. Therefore, for example, one of the silanol groups undergoes dehydration condensation with a hydroxyl group present on the surface of the ND particle to thereby form a covalent bond, and the remaining two silanol groups and the other silanol groups of the silane compound can condense and form a siloxane bond (Si—O—Si). Thus, the compound can impart, to the ND particles, affinity for the organic dispersion medium, and superb dispersibility in the organic dispersion medium can be exhibited.

The ND particles constituting the surface-modified NDs preferably contain primary particles of nanodiamond. In addition, the ND particle constituting the surface-modified ND may contain a secondary particle in which a plurality of the primary particles is aggregated (agglutinated). Furthermore, the surface of the surface-modified ND may have one or two or more of other surface functional groups (for example, an amino group, a hydroxy group, and a carboxy group) in addition to the surface-modifying group.

A mass ratio of the ND to the surface-modifying group in the surface-modified ND [ND/surface-modifying group] is not particularly limited, but is preferably 0.5 or greater, and more preferably 2.5 or greater. In addition, the mass ratio is preferably 15.0 or lower, more preferably 10.0 or lower, even more preferably 7.0 or lower, and particularly preferably 5.0 or lower. With the mass ratio of 0.5 or higher, the surface-modified ND is less likely to impair properties as a nanodiamond material. When the mass ratio is 15.0 or less (in particular, 7.0 or less), the degree of modification of the surface-modifying group is sufficient, and dispersibility in the organic dispersion medium is superior. The mass ratio can be determined based on the mass loss rate at 200° C. to 450° C. as measured by thermogravimetric analysis, with the weight loss being considered as the mass of the surface-modifying group.

(Organic Dispersion Medium)

Known or commonly used organic solvents can be used as the organic dispersion medium. Among these, from the viewpoint of excellent dispersibility of ND particles in an organic dispersion medium with a smaller SP value, the organic dispersion medium preferably has an SP value [solubility parameter by Hildebrand (δ), at 25° C., unit: $(cal/cm^3)^{1/2}$] from 6.0 to 12.0, and more preferably 6.0 or greater and less than 11.0. In particular, by the compounding of the fatty acid ester dispersing agent, the ND dispersion composition has excellent dispersibility of ND particles even when an organic solvent with low dispersibility of ND particles is used. As such, the organic dispersion medium preferably has a SP value of 8.2 or smaller (such as from 6.0 to 8.2) or 9.0 or greater (such as from 9.0 to 12.0), and more preferably 8.0 or smaller (such as from 6.5 to 8.0) or 9.2 or greater (such as from 9.2 to 12.0, preferably from 9.2 to smaller than 11.0). A single type of the organic dispersion medium may be used, or two or more types of organic dispersion mediums may be used. Note that when two or more types of organic dispersion media are used, a SP value of the mixture of the two or more types of organic dispersion media is preferably within the ranges described above while a SP value of each organic dispersion medium may be outside the ranges described above.

Examples of the organic dispersion medium include: alkanes such as hexane (SP: 7.0); ketones such as acetone (SP: 10.0), methyl ethyl ketone (MEK, SP: 9.3), and methyl isobutyl ketone (MIBK, SP: 8.4); ethers such as dioxane (SP: 9.8) and tetrahydrofuran (SP: 9.1); alcohols such as n-propanol (SP: 11.9), isopropanol (IPA, SP: 11.5), hexanol (SP: 10.7), and cyclohexanol (SP: 11.4); esters such as ethyl acetate (SP: 9.1) and polyol esters (SP: 9.6); aromatic compounds such as toluene (SP: 8.8) and alkylbenzene (SP: 7.6); halogenated hydrocarbons such as chloroform (SP: 9.3), methylene chloride (SP: 9.7), and ethylene dichloride (SP: 9.8); carbonate compounds such as an ethylene carbonate/diethyl carbonate (EC/DEC=1/1: volume ratio) mixed solvent (SP: 11.75) and an ethylene carbonate/diethyl carbonate/methyl ethyl carbonate (1/1/1: volume ratio) mixed solvent (SP: 10.97); polyolefins such as poly-α-olefins (SP: approximately from 6.0 to 8.0); and mineral oils (SP: approximately from 6.0 to 8.0), acetic acid (SP: 12.4), and acetonitrile (SP: 11.8).

In addition, when the ND dispersion composition is used as a lubricant described below, the organic dispersion medium may be a lubricant base material. A known or commonly-used organic solvent used as a lubricant base material can be used as the lubricant base material. Examples of such an organic solvent include polyphenyl ethers, alkylbenzenes, alkylnaphthalenes, ester oils, glycol-based synthetic oils, polyolefin-based synthetic oils, and mineral oils. Specific examples include poly-α-olefins, ethylene-α-olefin copolymers, polybutene, alkylbenzenes, alkylnaphthalenes, polyalkylene glycols, polyphenyl ethers, alkyl-substituted diphenyl ethers, polyol esters, dibasic esters, carbonates, phosphates, silicone oils, fluorinated oils, gas-to-liquids (GTL), and mineral oils. Among these, polyol esters, poly-α-olefins, mineral oils, alkylbenzenes, and polyalkylene glycols are preferable from the viewpoint of further reducing the amount of wear of sliding members.

Furthermore, when the lubricant base material is used as the organic dispersion medium, since the ND dispersion composition has excellent dispersibility of the ND particles even in the lubricant base material, blending of another dispersion solvent (e.g., ethanol, DMSO) besides the lubricant base material to improve dispersibility is not required. Thus, the content of the solvent (especially, dispersion solvent) other than the lubricant base material is preferably less than 1000 parts by mass, more preferably 100 parts by mass or less, and even more preferably 50 parts by mass or less, with respect to 100 parts by mass of the total amount of the ND particles, and particularly preferably substantially no such a solvent is contained (i.e., no actively blended solvent except for inevitably existing solvent).

Fatty Acid Ester Dispersing Agent

In the ND dispersion composition, the dispersibility of ND particles in the organic dispersion medium is exceptional because of the use of the fatty acid ester dispersing agent. In addition, because fatty acid ester dispersing agents have a high heat resistance, decomposition due to heat is unlikely to occur. Therefore, even when the ND dispersion composition is used in an environment in which the temperature is raised during use or used in a high-temperature environment, the ND dispersion composition exhibits excellent dispersion stability in a high-temperature environment, and discoloration is also unlikely to occur. Furthermore, since fatty acid ester dispersing agents are commercially available and easy to obtain, they do not need be produced via a complicated production process, leading to excellent ease of production. Only one fatty acid ester dispersing agent may be used, or two or more may be used.

An acid value of the fatty acid ester dispersing agent is preferably 40 mgKOH/g or less, more preferably 35 mgKOH/g or less, more preferably 30 mgKOH/g or less, even more preferably 20 mgKOH/g or less, and particularly preferably 6 mgKOH/g or less. Furthermore, the acid value may be, for example, 0.1 mgKOH/g or greater, 0.3 mgKOH/g or greater, or 0.5 mgKOH/g or greater. When the acid value is 40 mgKOH/g or less (in particular, 30 mgKOH/g or less), dispersibility in an organic dispersion medium having a small SP value tends to be superior.

An amine value of the fatty acid ester dispersing agent is preferably 5 mgKOH/g or less, more preferably 1 mgKOH/g or less, even more preferably 0.5 mgKOH/g or less, further preferably 0.1 mgKOH/g or less, and particularly preferably 0 mgKOH/g.

An average molecular weight Mp of the fatty acid ester dispersing agent is preferably 300 or greater, more preferably 1000 or greater (such as from 1000 to 100000), and even more preferably 3000 or greater (such as from 3000 to 10000). When the average molecular weight Mp is 300 or greater, dispersibility in an organic dispersion medium having a small SP value tends to be superior. Note that the average molecular weight Mp is a molecular weight measured by gel permeation chromatography (GPC) and calibrated with a polystyrene standard.

A mass loss rate (sometimes referred to as "mass loss rate at 200° C. for 180 minutes") of the fatty acid ester dispersing agent when the fatty acid ester dispersing agent is held in an air atmosphere at a temperature of 200° C. for 180 minutes is preferably 30% or less, more preferably 25% or less, even more preferably 20% or less, and particularly preferably 15% or less. When the mass loss rate is 30% or less, the ND dispersion composition has superior heat resistance and excellent dispersion stability in a high-temperature environment. The mass loss rate can be measured by thermogravimetric-differential thermal analysis (TG-DTA).

The fatty acid ester dispersing agent may have an acidic functional group. Examples of the acidic functional group include carboxylic acids, sulfonic acids, and salts thereof.

Examples of a fatty acid constituting the fatty acid ester dispersing agent include carboxylic acids, sulfonic acids, and salts thereof. Examples of the carboxylic acid include aliphatic monocarboxylic acids such as acetic acid, propionic acid, caprylic acid, nonanoic acid, capric acid, octylic acid, lauric acid, myristic acid, palmitic acid, stearic acid, oleic acid, isononanoic acid, and arachidic acid; and aromatic monocarboxylic acids such as benzoic acid and p-(t-butylbutyl)benzoic acid.

Examples of the sulfonic acid include naphthalenesulfonic acid. The fatty acid is preferably a higher fatty acid. That is, the fatty acid ester dispersing agent is preferably a higher fatty acid ester dispersing agent. One type of the fatty acid may be used, or two or more types may be used.

Examples of a compound constituting the ester component of the fatty acid ester dispersing agent include: a cyclic ester compound such as propiolactone, valerolactone, and caprolactone; a condensate of a glycol and a dibasic acid; and glycerin. In addition, a molecular weight of polyester in the fatty acid ester dispersing agent is preferably approximately from 300 to 9000, and more preferably from 400 to 6000. Specific examples of the fatty acid ester dispersing agent include glycerol monooleate.

A commercially available product can be used as the fatty acid ester dispersing agent. Examples of the commercially available product of the fatty acid ester dispersing agent include a product under the trade name "AJISPER PA111" and a product under the trade name "AJISPER PN411" (both available from Ajinomoto Fine-Techno Co., Inc.), and a product under the trade name "RHEODOL MO-60" (available from Kao Corporation).

The ND dispersion composition may or may not contain zirconia. When the ND dispersion composition contains zirconia, zirconia may be attached to the ND particles or may be dispersed in the ND dispersion composition without being attached to the ND particles. The attached state of zirconia may be physical attachment (bonding, adhesion, or the like), may be chemical attachment (covalent bonding with ND particles or the surface-modifying group, bonding by intermolecular forces, hydrogen bonding, ionic bonding, or the like), or may be both physical and chemical attachment.

A content ratio of zirconia in the ND dispersion composition is preferably less than 100 mass ppm, more preferably 20 mass ppm or less, and even more preferably 2 mass ppm or less. When the content ratio of zirconia is less than 100 mass ppm, in a case in which the ND dispersion composition is used as a lubricant (in particular, as an initial running-in lubricant), the formability of a running-in surface is excellent, and the running-in surface can be easily formed on an opposed sliding member. In addition, the contamination of the running-in surface by zirconium is suppressed, and even a thin film of the lubricant can achieve excellent wear suppression effect and friction reduction effect. The lower limit of the content ratio of zirconia may be, for example, 0.02 mass ppm or 0.1 mass ppm.

Furthermore, the content ratio of zirconia in the ND dispersion composition may be from 0.01 to 7.5 mass %, or may be from 0.1 to 6.0 mass %, from 0.25 to 4.5 mass %, or from 0.5 to 3.0 mass %. Furthermore, a content ratio of zirconia in the lubricant composition may be, for example, from 0.1 to 3000 mass ppm, and may be from 0.2 to 1500 mass ppm, from 0.5 to 750 mass ppm, or from 1 to 150 mass ppm. The ND dispersion composition has excellent dispersibility of ND particles, and thus the dispersibility in the organic dispersion medium (in particular, a lubricant base material) is excellent even when the content ratio is in such a two-part ranges. Therefore, for example, the content ratio of zirconia in the ND dispersion composition during distribution can be different from the content ratio of zirconia in the ND dispersion composition when in use, such as from 0.01 to 7.5 mass % during distribution and from 0.1 to 3000 mass ppm when in use.

The content ratio of zirconia can be determined based on a detected amount of Zr on the basis of the dispersion liquid with a known content ratio, in which Zr is detected by high-frequency inductively coupled plasma emission spectroscopy (ICP emission spectroscopy). The ND dispersion composition is often contaminated by zirconia which comes from zirconia beads contained in a bead mill used to disintegrate ND particle agglutinates and nanodisperse ND particles. Therefore, by not carrying out bead milling using zirconia beads or by minimizing the time for such bead milling, an ND dispersion composition having a low content ratio of zirconia can be obtained.

The ND dispersion composition can be preferably used, for example, as an additive that imparts a property of fine ND particles to, for example, a resin (such as a thermosetting or photocurable resin and a thermoplastic resin). Examples of the property of ND particles include mechanical strength, a high refractive index, thermal conductivity, an insulating property, an antioxidant property, crystallization promoting effect, and dendrite suppression effect. In addition, a composition obtained by adding the ND dispersion composition to a resin can be preferably used as, for example, a functional hybrid material, a thermally functional (such as heat resistant, heat storing, thermo-electrically conductive, and heat insulating) material, a photonic material (such as an organic EL element, an LED, a liquid crystal display, and an optical disk), a bio/biocompatible material, a coating material, a film material (such as a hard coating film for a touch screen or various displays, and a thermal barrier film), a sheet material, a screen material (such as a transmission type transparent screen), a filler material (such as a filler for heat radiation or for improving a mechanical property), a heat resistant plastic substrate material (such as a substrate for a flexible display), and a material for a lithium ion battery. Furthermore, the ND dispersion composition can also be preferably used as a friction-reducing agent or a lubricant (for initial running-in or for main lubrication, etc.) applied to, for example, a sliding part of a mechanical component (such as an automobile or an aircraft).

The lubricant for initial running-in (initial running-in lubricant) is used to form a low-friction surface (running-in surface) at an initial stage of a machine having a sliding member. By using the initial running-in lubricant, for example, recesses and protrusions of a surface of the sliding member is smoothed and thus the surface is made flat, or a modified surface is formed. After the running-in surface is formed, the initial running-in lubricant is removed through, for example, washing, and sliding using a lubricant for performing main lubrication is carried out. Here, the "lubricant for performing main lubrication" refers to a lubricant that is continuously present on a sliding part and is not normally removed during operation of the sliding member (during use of a machine). Note that the initial running-in lubricant can be used as the lubricant for performing main lubrication, either as it is without being removed after the running-in surface is formed, or after being removed and then supplied again to the sliding part.

Method for Producing Nanodiamond Dispersion Composition

The ND dispersion composition can be produced, for example, by mixing the ND particles, the fatty acid ester dispersing agent, and an additional component as necessary, in the organic dispersion medium. For example, a dispersion composition that uses surface-modified ND particles can be produced via a step in which a compound for surface treatment is reacted with the ND particles in the organic dispersion medium (modification step). In such case, a solvent used in the modification step may be used as-is as the organic dispersion medium of the ND dispersion composition, or the solvent may be replaced after the modification step.

In the modification step, when the ND particles contain ND particle aggregates, which are secondary particles formed of agglutinated ND particles, the reaction between the compound that performs a surface modification and the ND particles may be carried out while the ND particles are being disintegrated or dispersed. This is because by doing so, the ND particle aggregates can be disintegrated into primary particles, the surfaces of the ND primary particles can be modified, and the dispersibility of nanodiamond particles in the ND dispersion composition can be improved.

(1) Modification and Dispersion Step

First, the modification step in which the reaction between the compound that performs a surface modification and the ND particles is carried out while the ND particles are being disintegrated or dispersed (modification and dispersion step) will be described. A mass ratio (ND particles:compound) of the ND particles to the compound for surface treatment (in particular, a silane compound) that are supplied to the reaction in the modification step, is, for example, from 2:1 to 1:20. Furthermore, the concentration of the ND particles in the organic dispersion medium when implementing the surface treatment is, for example, from 0.5 to 10 mass %, and the concentration of the compound in the organic dispersion medium is, for example, from 5 to 40 mass %.

The reaction time for the surface treatment is, for example, from 4 to 20 hours. Furthermore, the reaction is preferably performed while heat that is generated is removed through cooling using ice water or the like.

Examples of the method for disintegrating or dispersing the ND particles include methods that process the ND particles using a high shearing mixer, a high shear mixer, a homomixer, a ball mill, a bead mill, a high pressure homogenizer, an ultrasonic homogenizer, a colloid mill, or a jet mill. Among these, implementing an ultrasonic treatment in the presence of a disintegrating medium (such as zirconia beads for example) is preferred.

The diameter of the disintegration medium (such as zirconia beads for example) is, for example, from 15 to 500 μm, preferably from 15 to 300 μm, and particularly preferably from 15 to 100 μm.

(2) Modification Step

The modification step of producing a surface-modified ND including the group represented by Formula (I) above can be performed separately from the disintegration or dispersion of ND particles to minimize contamination of the ND dispersion composition by zirconia. The surface-modified ND can be produced by a production method having a step (sometimes referred to as "reaction step") of reacting ND particles having a hydroxy group or a carboxy group on the surface, the ND particles in a state of being nanodispersed in water, with a compound represented by Formula (II) below in the presence of an acid catalyst to obtain surface-modified ND particles:

$$R—X—H \qquad (II)$$

In Formula (II), X and R respectively correspond to R and X in Formula (I) above.

In the reaction step, ND particles having a hydroxy group and/or a carboxy group on the surface that are in a state of being nanodispersed in water are reacted with the compound represented by Formula (II) above, and dehydration condensation between the hydroxy group and/or the carboxy group of the ND particles and the —H of the compound represented by Formula (II) above yields surface-modified ND particles.

The reaction described above is carried out in a state where the ND particles are nanodispersed in water, that is, the reaction is carried out in a water dispersion composition of the ND particles. A median diameter (D50) of the ND particles in the water dispersion composition is preferably from 1 to 100 nm, more preferably from 1 to 50 nm, and even more preferably from 1 to 10 nm. When the median diameter is within such a range, the amount of hydroxy groups and/or carboxy groups on the surfaces of the ND particles is large, and the reaction with the compound represented by Formula (II) above proceeds more. In addition, the resulting surface-modified ND particles have excellent dispersibility.

The acid catalyst can be a known or commonly-used acid catalyst used in, for example, esterification of a carboxylic acid and an alcohol, a dehydration condensation reaction of an alcohol and an amine, a dehydration condensation reaction of an alcohol and a thiol. Examples of the acid catalyst include a sulfonic acid group-containing compound, hydrochloric acid, nitric acid, sulfuric acid, sulfur trioxide, phosphoric acid, boric acid, a trihaloacetic acid (such as trichloroacetic acid and trifluoroacetic acid), a salt thereof (such as an ammonium salt), and an inorganic solid acid. Only one, or two or more of the acid catalysts may be used.

The acid catalyst may be in either a form of a homogeneous catalyst that may dissolve in a solvent or substrate during the reaction or in a form of a heterogeneous catalyst that does not dissolve during the reaction. Examples of the heterogeneous catalyst include a supported catalyst in which an acid component is supported on a carrier.

Examples of the sulfonic acid group-containing compound include an aliphatic sulfonic acid, such as methanesulfonic acid, ethanesulfonic acid, propanesulfonic acid, butanesulfonic acid, dodecanesulfonic acid, hexadecanesulfonic acid, trifluoromethanesulfonic acid, and heptadecafluorooctanesulfonic acid; an alicyclic sulfonic acid, such as 10-camphorsulfonic acid; an aromatic sulfonic acid, such as benzenesulfonic acid, p-toluenesulfonic acid, 2,4,6-trimethylbenzenesulfonic acid, hexylbenzenesulfonic acid, octylbenzenesulfonic acid, decylbenzenesulfonic acid, dodecylbenzenesulfonic acid (DBSA), octadecylbenzenesulfonic acid, 1-naphthalenesulfonic acid, 2-naphthalenesulfonic acid, and butyl-2-naphthalenesulfonic acid; and a sulfonic acid type ion-exchange resin, 3-[trioctylammonio]propane-1-sulfonic acid-triflimide, 4-[trioctylammonio]butane-1-sulfonic acid-triflimide, and a compound represented by Formula (A) below:

[Chem. 5]

(A)

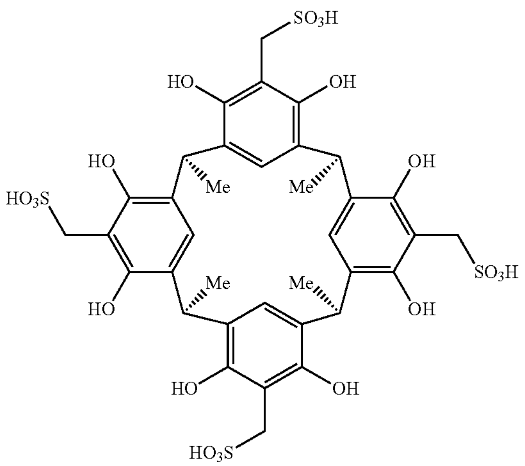

Examples of the inorganic solid acid include silica, silica-alumina, alumina, zeolites, activated clay, and montmorillonite.

Examples of the ammonium salt as the acid catalyst include a salt of an ammonium ion represented by Formula (B-1) below, a salt of an ammonium ion represented by Formula (B-2) below, a salt of an ammonium ion represented by Formula (B-3) below, and a salt of an ammonium ion represented by Formula (B-4) below:

[Chem. 6]

(B-1)

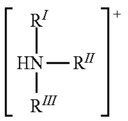

(B-2)

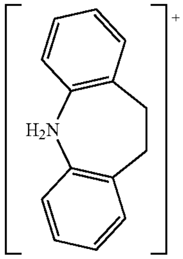

(B-3)

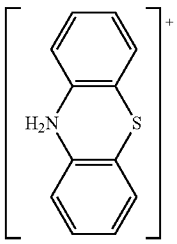

-continued (B-4)

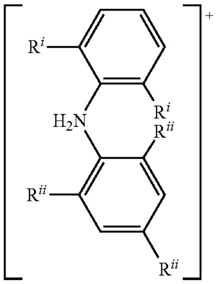

In Formula (B-1), $R^I$ to $R^{III}$ all or independently represent a hydrogen atom, an aliphatic hydrocarbon group, or a group containing an aromatic hydrocarbon group. The aliphatic hydrocarbon group is preferably a linear or branched $C_{1-22}$ hydrocarbon group. Examples of the group containing an aromatic hydrocarbon group include an aromatic hydrocarbon group, such as a phenyl group; and a group in which an aliphatic hydrocarbon group and an aromatic hydrocarbon group are bonded, such as a 4-t-butylphenyl group and a mesityl group. Among these, two or more of $R^I$ to $R^{III}$ are preferably a group containing an aromatic hydrocarbon group.

The acid anion serving as the counter anion of the ammonium ion represented by Formulas (B-1) to (B-3) above is preferably a sulfonate ion, more preferably an aromatic sulfonate ion, and particularly preferably a p-dodecylbenzene sulfonate ion.

In Formula (B-4), $R^i$ and $R^{ii}$ both or independently represent a hydrogen atom, an aliphatic hydrocarbon group, or a group containing an aromatic hydrocarbon group. The aliphatic hydrocarbon group is preferably a linear or branched $C_{1-4}$ hydrocarbon group. Examples of the group containing an aromatic hydrocarbon group include an aromatic hydrocarbon group, such as a phenyl group, and a group in which an aliphatic hydrocarbon group and an aromatic hydrocarbon group are bonded. Among these, a hydrogen atom, a methyl group, an isopropyl group, and a phenyl group are preferable.

The acid anion serving as the counter anion of the ammonium ion represented by Formula (B-4) above is preferably a sulfonate ion or a sulfate ion, and particularly preferably a trifluoromethanesulfonate ion, a 10-camphorsulfonate ion, a benzenesulfonate ion, or a sulfate ion.

The acid anion serving as the counter anion of the ammonium ion represented by Formulas (B-1) to (B-4) above may form a complex salt by forming a hydrogen bond with an oxygen atom forming an acid group and a hydrogen atom on a nitrogen atom in Formulas (B-1) to (B-4) above. Regarding the complex salt, one ammonium cation and one acid anion may form one salt, or two ammonium cations and two acid anions may form one salt; the number of ammonium cations and the number of acid anions forming one salt is not particularly limited. Furthermore, the acid anion may form a multimer in one salt. For example, a sulfuric acid that forms sulfate ions may form a structure represented by $[H_2SO_4(SO_3)_X]$. Examples of the complex salt formed by an acid anion and Formula (B-4) above include a compound represented by Formula (C) below:

[Chem. 7]

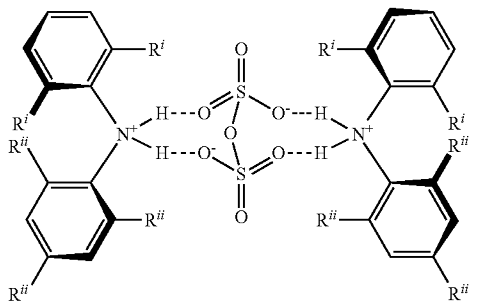

(C)

In Formula (C) above, $R^i$ and $R^{ii}$ are the same as those in Formula (B-4) above.

Among these, from the viewpoint of further promoting the reaction described above, the acid catalyst is preferably a sulfonic acid group-containing compound or an ammonium salt of a sulfonic acid group-containing compound.

A ratio of the ND particles to the compound represented by Formula (II) above (former:latter, ratio by mass) supplied for the reaction is, for example, from 1:1 to 1:25. In addition, a concentration of the ND particles in the water dispersion composition is, for example, from 1 to 10 mass %, and a concentration of the compound represented by Formula (II) above in the water dispersion composition is, for example, from 1 to 60 mass %.

Reaction conditions for the ND particles and the compound represented by Formula (II) above can be appropriately selected from, for example, a temperature from 0 to 100° C., a reaction time from 1 to 48 hours, and a pressure from 1 to 5 atm.

In this manner, a water dispersion composition of a surface-modified ND containing a group represented by Formula (I) above can be obtained.

Note that when an ND dispersion composition using an organic dispersion medium with relatively low dispersibility of ND particles is obtained, or when an ND dispersion composition is obtained as a water dispersion composition, the dispersion medium in the ND dispersion composition may be replaced. For example, a dispersing agent may be added to an ND dispersion composition with relatively high dispersibility of ND particles, and the organic dispersion medium in the ND dispersion composition may be distilled off using an evaporator or the like, and then a new organic dispersion medium may be mixed and stirred. By adopting a method in which first a dispersion composition having ND particles nano-dispersed therein is obtained and then the organic dispersion medium is replaced without rendering the ND particles into a dry powder, and by appropriately selecting the organic dispersion media for before and after the replacement while taking into consideration the wettability and solubility in the two organic dispersion media, the ND particles are easily nano-dispersed in an organic dispersion medium with a relatively low dispersibility. Note that the addition and stirring of the dispersing agent may be performed either before or after the dispersion medium is replaced. In addition, when replacement of dispersion medium is not performed, the dispersion medium may be added to the obtained ND dispersion composition and stirred.

In this manner, an ND dispersion composition in which ND particles are dispersed in an organic solvent can be obtained.

Note that the ND particles can be manufactured by, for example, a detonation method. Examples of the detonation method include an air-cooling detonation method and a water-cooling detonation method. Among these, the air-cooling detonation method is preferred from the viewpoint of being able to obtain ND particles having smaller primary particles compared to the case of the water-cooling detonation method.

The detonation may be performed in an air atmosphere, or may be performed in an inert gas atmosphere, such as a nitrogen atmosphere, an argon atmosphere, or a carbon dioxide atmosphere.

An example of the method for producing ND particles is described below; however, the ND particles are not limited to those obtained by the following production method.

Formation

First, a molded explosive attached with an electric detonator is placed inside a pressure-resistant vessel for detonation, and the vessel is sealed in a state where gas of atmospheric composition at normal pressure and the explosive to be used coexist inside the vessel. The container is, for example, made of iron, and the volume of the container is, for example, from 0.5 to 40 $m^3$. A mixture of trinitrotoluene (TNT) and cyclotrimethylenetrinitramine, i.e., hexogen (RDX), can be used as the explosive. The mass ratio (TNT/RDX) of TNT to RDX is, for example, in a range from 40/60 to 60/40.

In the formation, the electric detonator is then triggered to detonate the explosive in the vessel. "Detonation" refers to an explosion, among those associated with a chemical reaction, wherein a flame surface where the reaction occurs travels at a high speed exceeding the speed of sound. During the detonation, the explosive that is used undergoes partially incomplete combustion and releases carbon, and the carbon thereof is used as a raw material to produce ND particles through the action of the pressure and energy of the shock waves that are produced in the explosion. Due to Coulomb interaction between crystal planes as well as van der Waals forces between adjacent primary particles or crystallites, the produced ND particles aggregate very firmly to form agglutinates.

In the formation, next, the vessel and its interior are left to stand for approximately 24 hours at room temperature, and are thereby allowed to be cooled. After the cooling, the crude product of ND particles (including the soot and aggregates of the ND particles formed as described above) adhered to the inner wall of the vessel is scraped off with a spatula, and the crude product of ND particles is thereby collected. Crude product of ND particles can be obtained by the method described above. Furthermore, by implementing the producing of nanodiamonds described above several times, if necessary, a desired amount of the nanodiamond crude product can be obtained.

Acid Treatment

In acid-treating, a strong acid is allowed to act on a nanodiamond crude product, i.e., a raw material, in an aqueous solvent, for example, to remove metal oxides. The nanodiamond crude product obtained by the detonation method is prone to include a metal oxide, and the metal oxide is an oxide of Fe, Co, Ni, or the like resulting from the vessel or the like used in the detonation method. The metal oxide can be dissolved and removed from the nanodiamond crude product by allowing a strong acid to act thereon (acid treatment) in an aqueous solvent, for example. The strong acid used in the acid treatment is preferably a mineral acid, and examples thereof include hydrochloric acid, hydrofluoric acid, sulfuric acid, nitric acid, and aqua regia. A single kind of the strong acid may be used, or two or more kinds of the strong acids may be used. The concentration of the strong acid used in the acid treatment is, for example, from 1 to 50 mass %. The acid treatment temperature is, for example, from 70 to 150° C. The duration of the acid treatment is, for example, from 0.1 to 24 hours. In addition, the acid treatment can be performed under reduced pressure, under normal pressure, or under increased pressure. After such an acid treatment, the solid content (containing the nanodiamond agglutinates) is washed with water through decantation for example. The solid content is preferably repeatedly washed with water by decantation until the pH of the precipitation solution reaches, for example, 2 to 3. If the content of the metal oxide in the nanodiamond crude product obtained by the detonation method is small, the acid treatment as described above may be omitted.

Oxidation Treatment

The oxidation treatment is a process to remove graphite from the ND particle crude product using an oxidizing agent. The ND particle crude product obtained by the detonation method includes graphite, and this graphite is derived from carbon that did not form ND particle crystals, the carbon thereof being from among the carbon released by partially incomplete combustion of the explosive that is used. The graphite can be removed from the ND particle crude product by allowing an oxidizing agent to act thereon in an aqueous solvent. Furthermore, by allowing the oxidizing agent to act thereon, an oxygen-containing group, such as a carboxy group or a hydroxy group, can be introduced onto the surface of a ND particle.

Examples of the oxidizing agent used in the oxidation treatment include chromic acid, chromic anhydride, dichromic acid, permanganic acid, perchloric acid, nitric acid, and mixtures thereof, a mixed acid of at least one acid selected therefrom and another acid (for example, sulfuric acid), and salts thereof. Among these, a mixed acid (in particular, a mixed acid of sulfuric acid and nitric acid) is preferably used since such a mixed acid is environmentally friendly and exhibits excellent performance in oxidizing and removing graphite.

The mixing ratio of sulfuric acid to nitric acid (the former/the latter, mass ratio) in the above-described mixed acid is preferably, for example, from 60/40 to 95/5 because when the mixing ratio is in this range, the graphite can be efficiently oxidized and removed at, for example, a temperature of 130° C. or higher (particularly preferably 150° C. or higher, and the upper limit being 200° C., for example), even under a pressure near normal pressure (for example, from 0.5 to 2 atm). The lower limit of the mixing ratio is preferably 65/35, and more preferably 70/30. The upper limit of the mixing ratio is preferably 90/10, more preferably 85/15, and still more preferably 80/20. When the mixing ratio is not less than 60/40, the content of sulfuric acid having a high boiling point is high, and therefore the reaction temperature becomes, for example, 120° C. or higher under a pressure near that of normal pressure, and therefore, the efficiency in graphite removal tends to be improved. When the mixing ratio is less than or equal to 95/5, nitric acid that greatly contributes to oxidation of graphite is contained in a larger amount, and thus efficiency in graphite removal tends to be improved.

The amount of use of an oxidizing agent (in particular, the mixed acid described above) is, for example, 10 to 50 parts by mass, preferably 15 to 40 parts by mass, and more preferably 20 to 40 parts by mass, based on 1 part by mass of the nanodiamond crude product. In addition, the amount of use of sulfuric acid in the mixed acid is, for example, 5 to 48 parts by mass, preferably 10 to 35 parts by mass, and more preferably 15 to 30 parts by mass, based on 1 part by mass of the nanodiamond crude product. In addition, the amount of use of nitric acid in the mixed acid is, for example, 2 to 20 parts by mass, preferably 4 to 10 parts by mass, and more preferably 5 to 8 parts by mass, based on 1 part by mass of the nanodiamond crude product.

Furthermore, when the above-mentioned mixed acid is used as the oxidizing agent, a catalyst may be used together with the mixed acid. When the catalyst is used, the removal efficiency of graphite can be further improved. Examples of the catalyst include copper (II) carbonate. The amount of use of the catalyst is, for example, from about 0.01 to about 10 parts by mass per 100 parts by mass of the nanodiamond crude product.

The oxidation treatment temperature is, for example, from 100 to 200° C. The duration of the oxidation treatment is, for example, from 1 to 24 hours. The oxidation treatment can be performed under reduced pressure, under normal pressure, or under increased pressure.

After the oxidation treatment described above, the supernatant is preferably removed by decantation, for example. In addition, in decantation, the solid content is preferably washed with water. The supernatant liquid from the initial washing with water is colored, and thus, the solid content is preferably repeatedly washed with water until the supernatant liquid becomes visually transparent.

Disintegrating Treatment

The ND particles may be subjected to a disintegrating treatment as necessary. The disintegrating treatment can be performed using, for example, a high shearing mixer, a high shear mixer, a homomixer, a ball mill, a bead mill, a high pressure homogenizer, an ultrasonic homogenizer, or a colloid mill. Note that the crushing treatment may be performed by a wet process (for example, a crushing treatment in a state of being suspended in water or the like), or may be performed by a dry process. When the disintegrating treatment is performed by a dry process, drying is preferably performed before the disintegrating treatment.

Drying

Drying is preferably implemented after the oxidation treatment described above. For example, a spray drying apparatus or an evaporator, etc., is used to evaporate the liquid content from the ND particle-containing solution obtained through the alkali and hydrogen peroxide treatment, after which the resulting residual solid content is dried by being heated and dried in a drying oven. The temperature for heating and drying is, for example, from 40 to 150° C. Through such drying, ND particles are obtained.

Furthermore, as necessary, the ND particles may be subjected to an oxidation treatment (for example, oxygen oxidation) or a reduction treatment (for example, a hydrogenation treatment) in a gas phase as necessary. By performing an oxidation treatment in the gas phase, ND particles having a large amount of C═O groups on the surface are obtained. In addition, by carrying out a reduction treatment in the gas phase, ND particles having a large amount of C—H groups on the surface are produced.

Each aspect disclosed in the present specification can be combined with any other feature disclosed herein. Note that each of the configurations, combinations thereof, or the like in each of the embodiments are examples, and additions, omissions, replacements, and other changes to the configurations may be made as appropriate without departing from the spirit of the present disclosure. In addition, each aspect of the invention according to the present disclosure is not limited by the embodiments or the following examples but is limited only by the claims.

EXAMPLES

An embodiment of the present disclosure will be described in further detail below based on examples.

Production Example 1

Production of Silane Compound Surface-Modified ND Particles (1)

First, the formation of nanodiamonds by a detonation method was performed. In the present formation, first, a molded explosive attached with an electric detonator was placed inside a pressure-resistant vessel for detonation, and the vessel was sealed. The vessel was made of iron and had a capacity of 15 $m^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of nanodiamond by detonation method). Then, the container was allowed to stand at room temperature for 24 hours to lower the temperatures of the container and its interior. After the cooling, a nanodiamond crude product (containing the aggregate of the nanodiamond particles and soot formed in the above detonation method), which adhered to the inner wall of the container, was scraped off with a spatula, and the nanodiamond crude product was thereby collected.

The nanodiamond crude product obtained by performing the formation as described above multiple times was then subjected to an acid treatment. Specifically, a slurry obtained by adding 6 L of a 10% by mass hydrochloric acid to 200 g of the nanodiamond crude product was subjected to a heat treatment under reflux at normal pressure conditions for 1 hour. The heating temperature in this acid treatment was from 85 to 100° C. Then, after cooling, the solid (containing the nanodiamond agglutinates and soot) was washed with water by decantation. The solid was repeatedly washed with water by decantation until the pH of a precipitation liquid reached 2 from the low pH side.

An oxidation treatment was then performed. Specifically, 6 L of 98% by mass sulfuric acid and 1 L of 69% by mass nitric acid were added to the precipitate solution (containing the nanodiamond aggregate) obtained through decantation after the acid treatment to form a slurry, and then the slurry was subjected to heat treatment under reflux at normal pressure conditions for 48 hours. The heating temperature in this oxidation treatment was from 140 to 160° C. Then, after cooling, the solid (containing the nanodiamond agglutinates) was washed with water by decantation. The initial supernatant liquid from the water washing was colored, and thus washing of the solid content with water by decantation was repeated until the supernatant liquid became visually transparent.

Next, 1000 mL of the nanodiamond-containing solution obtained through the water washing treatment described above was subjected to spray drying using a spray dryer (trade name "Spray Dryer B-290", available from Nihon Büchi K.K.) (drying step). Through this, 50 g of nanodiamond powder was obtained.

0.3 g of the nanodiamond particles obtained in the drying step described above was weighed into a reaction vessel; then, 13.5 g of MIBK and 1.2 g of hexyltrimethoxysilane as a silane compound were added thereto, and the mixture was stirred for 10 minutes.

After stirring, 36 g of zirconia beads (trade name "YTZ", available from Tosoh Corporation; diameter: 30 μm) was added. After the addition, under cooling in ice water, the mixture was subjected to an ultrasonic treatment for 20 hours using an ultrasonic disperser (model "UP-400s", available from Hielscher Ultrasonics GmbH) in a state where a tip of an oscillator of the ultrasonic disperser was immersed in the solution in the reaction vessel, and the ND particles and the silane compound were reacted. The mixture was initially gray, but the particle size gradually became smaller, and the dispersion state improved. Finally, the mixture became a uniform, black liquid. This is thought to be because the ND particles were sequentially released (disintegrated) from ND particle aggregates, the silane compound acted on the dissociated ND particles and bonded thereto, and ND particles surface-modified by the silane compound were dispersed and stabilized in the MIBK. In this manner, a silane compound surface-modified ND dispersion (MIBK dispersion) was obtained.

Production Example 2

Production of Oleylamino Group Surface-Modified ND Particles

A nanodiamond crude product obtained by a detonation method in the same manner as in Production Example 1 was subjected to an acid treatment step and an oxidation treatment step in the same manner as in Production Example 1. Thereafter, the solid content (containing the nanodiamond agglutinates) was washed with water by decantation. The initial supernatant liquid from the water washing was colored, and thus washing of the solid content with water by decantation was repeated until the supernatant liquid became visually transparent. Thereafter, the solid content was dried, and the ND agglutinate was obtained as a powder. Furthermore, the powder was heated in a rotary kiln, into which a gas of about 8 volume % oxygen and about 92 volume % nitrogen was blown at a flow rate of 20 L/min at 400° C. for 6 hours.

Next, the pH of approximately 30 ml of the slurry containing the ND agglutinates was adjusted to 10 using ammonia water. Thereafter, bead milling was performed using a bead milling apparatus (trade name "Parallel 4-Tube Sand Grinder Model LSG-4U-2L", available from Aimex Co., Ltd.). Specifically, 30 mL of the slurry after the ultrasonic irradiation and zirconia beads with a diameter of 30 μm were charged in a vessel (available from Aimex Co., Ltd.), which was a 100-mL mill vessel, and the vessel was sealed. Then, the apparatus was operated to perform bead milling. In this bead milling, the charged amount of zirconia beads is, for example, 33 volume % of the capacity of the mill vessel, the rotation speed of the mill vessel is 2570 rpm, and the duration of the milling is 3 hours.

Next, the slurry having undergone the disintegration as described above was subjected to centrifugation treatment (classification operation) using a centrifuge. The centrifugal force in this centrifugation treatment was 20000×g, and the duration of the centrifugation was 30 minutes. Next, 10 mL of supernatant of the ND-containing solution having undergone the centrifugation treatment was collected. In this manner, an ND aqueous dispersion in which nanodiamond was dispersed in pure water was obtained. This ND aqueous dispersion had a solid content concentration of 6.0 mass % and a pH of 9.0. The median diameter (particle size D50) of the ND aqueous dispersion obtained as described above was 6.0 nm.

Next, to 3.33 g of the ND aqueous dispersion obtained via the disintegration step described above, 1.5 mmol of dodecylbenzenesulfonic acid as an acid catalyst and 3 mmol of oleylamine were added, and the mixture was reacted for 8 hours at 80° C. while being stirred. After completion of the reaction, 10 g of toluene was added, and the mixture was cooled to room temperature. Thereafter, washing with water and saturated saline solution was performed to obtain a toluene dispersion composition of ND particles surface-modified by an oleylamino group.

Production Example 3

Production of Oleyloxy Group Surface-Modified ND Particles

In the same manner as in Production Example 2, to 1 g of the ND aqueous dispersion obtained via the disintegration step described above, 0.5 mmol of dodecylbenzenesulfonic acid as an acid catalyst and 2 mmol of oleyl alcohol were added, and the mixture was reacted for 24 hours at 80° C. while being stirred. After completion of the reaction, 10 mL of toluene was added, and the mixture was cooled to room temperature. Thereafter, washing with water and saturated saline solution was performed to obtain a toluene dispersion composition of ND particles surface-modified by an oleyloxy group.

Production Example 4

Production of Oleate Group Surface-Modified ND Particles

In the same manner as in Production Example 2, to 1 g of the ND aqueous dispersion obtained via the disintegration step described above, 0.5 mmol of dodecylbenzenesulfonic acid as an acid catalyst and 2 mmol of oleic acid were added, and the mixture was reacted for 24 hours at 100° C. while being stirred. After completion of the reaction, 10 mL of toluene was added, and the mixture was cooled to room temperature. Thereafter, washing with water and saturated saline solution was performed to obtain a toluene dispersion composition of surface ND particles modified by an oleate group.

Production Example 5

Production of Silane Compound Surface-Modified ND Particles (2)

0.3 g of the nanodiamond particles obtained in the drying in the same manner as in Production Example 1 was weighed into a reaction vessel; then, 13.5 g of toluene and 1.2 g of hexyltrimethoxysilane as a silane compound were added thereto, and the mixture was stirred for 10 minutes.

After stirring, 36 g of zirconia beads (trade name "YTZ", available from Tosoh Corporation; diameter: 30 μm) was added. After the addition, under cooling in ice water, the mixture was subjected to an ultrasonic treatment for 7 hours using an ultrasonic disperser (model "UP-400s", available from Hielscher Ultrasonics GmbH) in a state where a tip of an oscillator of the ultrasonic disperser was immersed in the solution in the reaction vessel, and the ND particles and the silane compound were reacted. The mixture was initially gray, but the particle size gradually became smaller, and the dispersion state improved. Finally, the mixture became a uniform, black liquid. This is thought to be because the ND particles were gradually released (disintegrated) from ND particle aggregates, the silane compound acted on the dissociated ND particles and bonded thereto, and the ND particles surface-modified by the silane compound were dispersed and stabilized in toluene. In this manner, a silane compound surface-modified ND dispersion (toluene dispersion) was obtained.

Examples 1 to 4

Production of ND Dispersion Composition

To 10 g of the surface-modified ND dispersion obtained in Production Example 1, 0.2 g of a dispersing agent was added and stirred. Thereafter, MIBK was distilled off by a rotary evaporator, and a dispersion medium was added to make a total weight of 10 g. In this manner, ND dispersion compositions were produced. Note that the ND dispersion compositions had a nanodiamond concentration of 2 mass %. The nanodiamond concentration was calculated from the absorbance at 350 nm. The dispersing agents and dispersion media used in Examples 1 to 4 were as described below.

Example 1

Dispersing agent: Higher fatty acid ester dispersing agent (acid value: 35 mgKOH/g, amine value: 0 mgKOH/g, average molecular weight: Mp 5200, mass loss rate at 200° C. for 180 minutes: 17.8%)

Dispersion medium: Polyol ester (POE)

Example 2

Dispersing agent: Higher fatty acid ester dispersing agent (acid value: 35 mgKOH/g, amine value: 0 mgKOH/g, average molecular weight: Mp 5200, mass loss rate at 200° C. for 180 minutes: 17.8%)

Dispersion medium: Hexane

Example 3

Dispersing agent: Higher fatty acid ester dispersing agent (acid value: 0.5 mgKOH/g, amine value: 0 mgKOH/g, average molecular weight: Mp 8100, mass loss rate at 200° C. for 180 minutes: 12.1%)

Dispersion medium: POE

Example 4

Dispersing agent: Higher fatty acid ester dispersing agent (acid value: 0.5 mgKOH/g, amine value: 0 mgKOH/g, average molecular weight: Mp 8100, mass loss rate at 200° C. for 180 minutes: 12.1%); Dispersion medium: Hexane Examples 5 to 10

Production of ND Dispersion Composition

To 3 g of each of the surface-modified ND dispersions obtained in Production Examples 2 to 4, 0.06 g of a dispersing agent was added and stirred. Thereafter, toluene was distilled off by a rotary evaporator, and a dispersion medium was added to make a total weight of 3 g. In this manner, ND dispersion compositions were produced. Note that the ND dispersion compositions had a nanodiamond concentration of 2 mass %. The nanodiamond concentration was calculated from the absorbance at 350 nm. The surface-modified NDs, dispersing agents, and dispersion media used in Examples 5 to 10 were as described below.

Example 5

Surface-modified ND: Oleylamino group surface-modified ND obtained in Production Example 2

Dispersing agent: Higher fatty acid ester dispersing agent (acid value: 0.5 mgKOH/g, amine value: 0 mgKOH/g, average molecular weight: Mp 8100, mass loss rate at 200° C. for 180 minutes: 12.1%)

Dispersion medium: POE

Example 6

Surface-modified ND: Oleylamino group surface-modified ND obtained in Production Example 2

Dispersing agent: Higher fatty acid ester dispersing agent (acid value: 0.5 mgKOH/g, amine value: 0 mgKOH/g, average molecular weight: Mp 8100, mass loss rate at 200° C. for 180 minutes: 12.1%)

Dispersion medium: Hexane

Example 7

Surface-modified ND: Oleyloxy group surface-modified ND obtained in Production Example 3

Dispersing agent: Higher fatty acid ester dispersing agent (acid value: 0.5 mgKOH/g, amine value: 0 mgKOH/g, average molecular weight: Mp 8100, mass loss rate at 200° C. for 180 minutes: 12.1%)

Dispersion medium: POE

Example 8

Surface-modified ND: Oleyloxy group surface-modified ND obtained in Production Example 3

Dispersing agent: Higher fatty acid ester dispersing agent (acid value: 0.5 mgKOH/g, amine value: 0 mgKOH/g, average molecular weight: Mp 8100, mass loss rate at 200° C. for 180 minutes: 12.1%)

Dispersion medium: Hexane

Example 9

Surface-modified ND: Oleate group surface-modified ND obtained in Production Example 4

Dispersing agent: Higher fatty acid ester dispersing agent (acid value: 0.5 mgKOH/g, amine value: 0 mgKOH/g, average molecular weight: Mp 8100, mass loss rate at 200° C. for 180 minutes: 12.1%)

Dispersion medium: POE

Example 10

Surface-modified ND: Oleate group surface-modified ND obtained in Production Example 4

Dispersing agent: Higher fatty acid ester dispersing agent (acid value: 0.5 mgKOH/g, amine value: 0 mgKOH/g, average molecular weight: Mp 8100, mass loss rate at 200° C. for 180 minutes: 12.1%)

Dispersion medium: Hexane

Comparative Examples 1 to 5

ND dispersion compositions were produced in the same manner as in Example 1 except that the following dispersing agents and dispersion media were used. Note that a dispersing agent was not used in Comparative Examples 1 and 2.

Comparative Example 1

Dispersion medium: Hexane

Comparative Example 2

Dispersion medium: POE

Comparative Example 3

Dispersing agent: Trade name "Solsperse 20000" (available from the Lubrizol Corporation, polyether dispersing agent, mass loss rate at 200° C. for 180 minutes: 49.2%)

Dispersion medium: POE

Comparative Example 4

Dispersing agent: Trade name "SN-SPERSE 70" (available from San Nopco Co., Ltd., unsaturated hydrocarbon-saturated fatty acid dispersing agent, mass loss rate at 200° C. for 180 minutes: 32.3%)

Dispersion medium: POE

Comparative Example 5

Dispersing agent: Trade name "SN-SPERSE 70" (available from San Nopco Co., Ltd., unsaturated hydrocarbon-saturated fatty acid dispersing agent, mass loss rate at 200° C. for 180 minutes: 32.3%)

Dispersion medium: Hexane

Examples 11 and 12

Production of ND Dispersion Composition

To 10 g (ND concentration: 2 mass %) of each of the surface-modified ND dispersions obtained in Production Examples 2 and 5, 0.1 g of a dispersing agent was added and stirred. Thereafter, toluene was distilled off by a rotary evaporator, and a dispersion medium was added to give a nanodiamond concentration of 4 wt. %, and gently stirred and mixed. In this manner, black and clear ND dispersion compositions were produced. Note that the nanodiamond concentration was calculated from the absorbance at 350 nm. The surface-modified NDs, dispersing agents, and dispersion media used in Examples 11 and 12 were as described below.

Example 11

Surface-modified ND: Silane compound surface-modified ND particles obtained in Production Example 5

Dispersing agent: Fatty acid ester dispersing agent (acid value: 2 mgKOH/g or less, amine value: 0 mgKOH/g, average molecular weight: Mp 360, mass loss rate at 200° C. for 180 minutes: 25.0%)

Dispersion medium: Poly-α-olefin (PAO)

Example 12

Surface-modified ND: Oleylamino group surface-modified ND obtained in Production Example 2

Dispersing agent: Fatty acid ester dispersing agent (acid value: 2 mgKOH/g or less, amine value: 0 mgKOH/g, average molecular weight: Mp 360, mass loss rate at 200° C. for 180 minutes: 25.0%)

Dispersion medium: PAO

Comparative Example 6

0.4 g of the nanodiamond powder obtained in the drying in the same manner as in Production Example 1, 0.2 g of the fatty acid ester dispersing agent (acid value: 2 mgKOH/g or less, amine value: 0 mgKOH/g, average molecular weight: Mp 360, mass loss rate at 200° C. for 180 minutes: 25.0%), and 9.4 g of PAO were added and vigorously agitated by a shaker. A part thereof became a gray turbid state, and the majority was in a precipitated state, and thus a black and clear ND dispersion composition like those in Examples 11 and 12 could not be obtained.

Evaluation

The ND dispersion compositions obtained in the Examples and Comparative Examples as well as the dispersing agents used in the Examples and Comparative Examples were evaluated as follows. The evaluation results are listed in a table.

(1) Haze Value

The ND dispersion compositions obtained in the Examples and Comparative Examples were measured using a haze measurement device (trade name "Haze Meter 300A", available from Nippon Denshoku Industries Co., Ltd.). Each sample liquid used in the measurement had been subjected to ultrasonic cleaning by an ultrasonic cleaner for 10 minutes. The thickness (inner dimension) of a measuring glass cell filled with the sample liquid and used for the measurement was 1 mm, and the optical path length in a sample subjected to the measurement was 1 mm. Note that the symbol "–" in the table indicates that measurement was not performed. Note that, for Examples 11 and 12, a sample which had been diluted to a nanodiamond concentration of 0.1 mass % by adding a dispersion medium was measured.

(2) D50

The ND dispersion compositions obtained in Examples and Comparative Examples were diluted to 0.1 mass % by the addition of a dispersion medium, and particle size distributions of ND particles were measured by dynamic light scattering (non-contact backscattering) using a device (trade name "Zetasizer Nano ZS") available from Malvern Panalytical Ltd.

(3) Dispersibility

The ND dispersion compositions obtained in Examples and Comparative Examples were diluted to 0.1 mass % by the addition of a dispersion medium, and visual evaluation of dispersibility was performed based on the following evaluation criteria.

Good: Clear and no aggregation is observed.

Marginal: Slightly cloudy but aggregation could not be confirmed.

Poor: Cloudy and obvious aggregation was confirmed.

(4) Viscosity

The ND dispersion compositions obtained in the Examples and Comparative Examples were measured using an EMS viscometer (trade name "EMS1000", available from Kyoto Electronics Co., Ltd.). 500 μL of a sample and φ2 mm aluminum balls were placed in a test tube, and measurement was performed at a temperature of 25° C. and a rotational speed of 1000 rpm.

(5) Mass Loss Rate at 200° C. for 180 Minutes

Mass loss rates at 200° C. for 180 minutes of the dispersing agents used in Examples and Comparative Examples were measured using a simultaneous thermogravimetric analyzer (trade name "TG-DTA 6200", available from Hitachi High-Tech Science Corporation) under the following conditions.

Atmosphere: Air

Temperature: The temperature was raised from 30° C. to 200° C. at a heating rate of 20° C./min and held for 180 minutes after reaching 200° C.

Sample tray: quartz

TABLE 1

| | Haze value | D50 [nm] | Dispersibility | Viscosity [mPa · s] |
|---|---|---|---|---|
| Example 1 | — | 30 | Good | 63.7 |
| Example 2 | — | 30 | Good | 0.29 |
| Example 3 | 0.06 | 30 | Good | 63.7 |
| Example 4 | 0.06 | 30 | Good | 0.29 |
| Example 5 | 0.21 | 60 | Good | 63.7 |
| Example 6 | 0.06 | 30 | Good | 0.29 |
| Example 7 | 0.00 | 20 | Good | 63.7 |
| Example 8 | 0.03 | 25 | Good | 0.29 |
| Example 9 | 0.02 | 30 | Good | 63.7 |
| Example 10 | 0.00 | 25 | Good | 0.29 |
| Example 11 | 0.03 | 38 | Good | 25.7 |
| Example 12 | 0.01 | 15 | Good | 25.7 |
| Comparative Example 1 | — | 250 | Poor | 0.29 |
| Comparative Example 2 | — | 250 | Poor | 63.7 |
| Comparative Example 3 | — | — | Marginal | 63.7 |
| Comparative Example 4 | — | — | Poor | 63.7 |
| Comparative Example 5 | — | — | Poor | 0.29 |
| Comparative Example 6 | — | — | Poor | 25.7 |

As evident from Table 1, the ND dispersion compositions using a fatty acid ester dispersing agent (Examples) had excellent dispersibility in hexane, POE, or PAO, which have small SP values. In comparison, when the dispersing agent was not used (Comparative Examples 1 and 2), and when a polyether dispersing agent (Comparative Example 3) or an unsaturated hydrocarbon-saturated fatty acid dispersing agent (Comparative Examples 4 and 5) was used, the ND dispersion compositions had poor dispersibility in hexane or POE, which have small SP values.

Furthermore, 40 g of the ND dispersion composition obtained in Example 3 was placed into an air-filled three-neck flask equipped with a stirrer and a thermometer, and was stirred for 17 hours at a heating temperature of 230° C. (liquid temperature from 190 to 200° C.). After heating, the degree of discoloration was visually evaluated, and the acid value was evaluated. As a result, the acid value was 0.43 mgKOH/g, and no discoloration could be confirmed. Note that when the same test was performed for Comparative Example 2 in which a dispersing agent was not used, the acid value was 0.42 mgKOH/g, and no discoloration could be confirmed. Therefore, the ND dispersion composition obtained in Example 3 was evaluated to have the same degree of heat resistance as when no dispersing agent was used. Note that in Examples 4 to 10, the same dispersing agent as that used in Example 3 were used, and the dispersing agents used in Examples 1 and 2 had the same degree of mass loss rate at 200° C. for 180 minutes as the dispersing agent used in Example 3. Therefore, it is inferred that Examples 1, 2, and 4 to 10 also have the same degree of heat resistance as Example 3.

Hereinafter, variations of the invention according to the present disclosure will be described.

[Appendix 1] A nanodiamond dispersion composition including an organic dispersion medium, nanodiamond particles dispersed in the organic dispersion medium, and a fatty acid ester dispersing agent.

[Appendix 2] The nanodiamond dispersion composition according to Appendix 1, wherein the fatty acid ester dispersing agent has a mass loss rate of 30% or less (preferably 20% or less, and more preferably 15% or less) when the fatty acid ester dispersing agent is held in an air atmosphere at a temperature of 200° C. for 180 minutes.

[Appendix 3] The nanodiamond dispersion composition according to Appendix 1 or Appendix 2, wherein the fatty acid ester dispersing agent has an acid value of 40 mgKOH/g or less (preferably 35 mgKOH/g or less, more preferably 30 mgKOH/g or less, even more preferably 20 mgKOH/g or less, and particularly preferably 6 mgKOH/g or less).

[Appendix 4] The nanodiamond dispersion composition according to any one of Appendices 1 to 3, wherein the fatty acid ester dispersing agent has an acid value of 0.1 mgKOH/g or grater (preferably 0.3 mgKOH/g or grater, and more preferably 0.5 mgKOH/g or grater).

[Appendix 5] The nanodiamond dispersion composition according to any one of Appendices 1 to 4, wherein the nanodiamond particles has an average dispersed particle size from 2 to 240 nm (preferably from 4 to 200 nm, more preferably from 5 to 100 nmnm, even more preferably from 10 to 70 nm, and particularly preferably from 12 to 40 nm).

[Appendix 6] The nanodiamond dispersion composition according to any one of Appendices 1 to 5, having a haze value of 5 or less (preferably 3 or less, more preferably 1 or less, and even more preferably 0.5 or less).

[Appendix 7] The nanodiamond dispersion composition according to any one of Appendices 1 to 6, wherein the organic dispersion medium has a SP value from 6.0 to 12.0 $(cal/cm^3)^{1/2}$ (preferably 6.0 or greater and less than 11.0).

[Appendix 8] The nanodiamond dispersion composition according to any one of Appendices 1 to 7, having a viscosity at 25° C. is from 0.2 to 120 mPa·s (preferably from 10 to 100 mPa·s, and more preferably from 20 to 90 mPa·s).

[Appendix 9] The nanodiamond dispersion composition according to any one of Appendices 1 to 8, wherein the fatty acid ester dispersing agent has an average molecular weight Mp of 300 or greater (preferably 1000 or greater, such as from 1000 to 100000, and more preferably 3000 or greater, such as from 3000 to 10000).

[Appendix 10] The nanodiamond dispersion composition according to any one of Appendices 1 to 9, wherein the fatty acid ester dispersing agent has an amine value of 5 mgKOH/g or less (preferably 1 mgKOH/g or less, more preferably 0.5 mgKOH/g or less, even more preferably 0.1 mgKOH/g or less, and particularly preferably 0 mgKOH/g).

[Appendix 11] The nanodiamond dispersion composition according to any one of Appendices 1 to 10, wherein a content ratio of nanodiamond particles is from 0.01 to 5.0 mass % (preferably from 0.1 to 4.0 mass %, more preferably from 0.25 to 3.0 mass %, and even more preferably from 0.5 to 2.0 mass %).

[Appendix 12] The nanodiamond dispersion composition according to any one of Appendices 1 to 10, wherein a content ratio of the nanodiamond particles is greater than 3.0 mass % (preferably 3.5 mass % or greater).

[Appendix 13] The nanodiamond dispersion composition according to any one of Appendices 1 to 12, wherein a content of the fatty acid ester dispersing agent with respect to 100 parts by mass of a total amount of the nanodiamond particles in the nanodiamond dispersion composition is from 10 to 10000 parts by mass (preferably from 50 to 1000 parts by mass, and more preferably from 70 to 300 parts by mass).

[Appendix 14] The nanodiamond dispersion composition according to any one of Appendices 1 to 13, wherein a content ratio of the fatty acid ester dispersing agent with respect to a total amount of a dispersing agent contained in the nanodiamond dispersion composition is 90 mass % or more (preferably 95 mass % or more, and more preferably 99 mass % or more).

[Appendix 15] The nanodiamond dispersion composition according to any one of Appendices 1 to 14, wherein a total content ratio of the nanodiamond particles, the fatty acid ester dispersing agent, and the organic dispersion medium with respect to the total amount of the nanodiamond dispersion composition is 70 mass % or greater (preferably 80 mass % or greater, more preferably 90 mass % or greater, even more preferably 95 mass % or greater, and particularly preferably 99 mass % or greater).

[Appendix 16] The nanodiamond dispersion composition according to any one of Appendices 1 to 15, wherein a content ratio of a surfactant other than the fatty acid ester dispersing agent with respect to the total amount of the nanodiamond dispersion composition is 30 mass % or less (preferably 20 mass % or less, more preferably 10 mass % or less, even more preferably 5 mass % or less, yet even more preferably 1 mass % or less, and particularly preferably less than 1 mass %).

[Appendix 17] The nanodiamond dispersion composition according to any one of Appendices 1 to 16, wherein the nanodiamond particles include a surface-modified nanodiamond particle that is surface-modified by a compound containing an organic group or a functional group containing an organic group.

[Appendix 18] The nanodiamond dispersion composition according to Appendix 17, wherein the organic group is an organic group having 4 or more carbons (such as from 4 to 25) (preferably 6 or more carbons (such as from 6 to 22), and more preferably 8 or more carbons (such as from 8 to 20)).

[Appendix 19] The nanodiamond dispersion composition according to any one of Appendices 1 to 18, wherein the nanodiamond particle includes a surface-modified nanodiamond in which a surface of a nanodiamond particle is modified by a group represented by Formula (I) below:

$$—X—R \qquad (I)$$

where X represents —Si—, —NH—, —O—, —O—C(═O)—, —C(═O)—O—, —NH—C(═O)—, —C(═O)—NH—, or —S—, and the bond extending to the left from X binds to the nanodiamond particle, and R represents a monovalent organic group, and an atom that binds to X is a carbon atom.

[Appendix 20] The nanodiamond dispersion composition according to Appendix 19, wherein the monovalent organic group is a monovalent substituted or unsubstituted hydrocarbon group, a group in which a monovalent substituted or unsubstituted hydrocarbon group and an alkoxy group are bonded, or a group in which a monovalent substituted or unsubstituted hydrocarbon group and a dialkylamino group are bonded.

[Appendix 21] The nanodiamond dispersion composition according to Appendix 19 or 20, wherein a number of carbon atoms in the monovalent organic group is from 4 to 25 (preferably from 6 to 22, and more preferably from 8 to 20).

[Appendix 22] The nanodiamond dispersion composition according to any one of Appendices 19 to 21, wherein X in Formula (I) represents —Si—, —NH—, —O—, —O—C(═O)—, or —C(═O)—O— (preferably —Si—, —NH—, —O—, or —O—C(═O)—).

[Appendix 23] The nanodiamond dispersion composition according to any one of Appendices 19 to 22, wherein in Formula (I), X is —O—, —O—C(═O)—, or —C(═O)—O—, and R is a monovalent substituted or unsubstituted hydrocarbon group (preferably a linear or branched hydrocarbon group having from 8 to 20 carbons).

[Appendix 24] The nanodiamond dispersion composition according to any one of Appendices 19 to 23, wherein in Formula (I), X is —NH—, and R is a monovalent organic group containing from 8 to 20 carbon atoms.

[Appendix 25] The nanodiamond dispersion composition according to any one of Appendices 19 to 24, wherein in Formula (I), X is —NH—, and R is a monovalent organic group containing a hydrocarbon group having 4 or more carbon atoms in a straight chain.

[Appendix 26] The nanodiamond dispersion composition according to any one of Appendices 19 to 25, wherein in Formula (I), R includes a hydrocarbon group having 4 or more carbon atoms in a straight chain.

[Appendix 27] The nanodiamond dispersion composition according to any one of Appendices 19 to 26, wherein in Formula (I), a molar ratio of carbon atoms to a total amount of heteroatoms selected from the group consisting of nitrogen atoms, oxygen atoms, sulfur atoms, and silicon atoms is 4.5 or greater (preferably 5 or greater, and more preferably 5.5 or greater).

[Appendix 28] The nanodiamond dispersion composition according to any one of Appendices 1 to 27, wherein the organic dispersion medium contains a lubricant base material, and a content of a solvent other than the lubricant base material with respect to 100 parts by mass of the total amount of the nanodiamond particles is less than 1000 parts by mass (preferably 100 parts by mass or less, more preferably 50 parts by mass or less, and even more preferably not substantially contained).

INDUSTRIAL APPLICABILITY

The nanodiamond dispersion composition according to the present disclosure exhibits mechanical strength, a high refractive index, thermal conductivity, insulating properties, antioxidation properties, and an action of promoting the crystallization of resins and the like, and can be used for products having these characteristics.

The invention claimed is:

1. A nanodiamond dispersion composition comprising an organic dispersion medium, nanodiamond particles dispersed in the organic dispersion medium, and a fatty acid ester dispersing agent, the nanodiamond particles being surface-modified by a surface-modifying group or compound containing an organic group, wherein a content of the fatty acid ester dispersing agent with respect to 100 parts by mass of a total amount of the nanodiamond particles in the nanodiamond dispersion composition is from 10 to 1000 parts by mass.

2. The nanodiamond dispersion composition according to claim 1, wherein a content ratio of the nanodiamond particles is greater than 3.0 mass %.

3. The nanodiamond dispersion composition according to claim 1, wherein the fatty acid ester dispersing agent has a mass loss rate of 30% or less when the fatty acid ester dispersing agent is held in an air atmosphere at a temperature of 200° C. for 180 minutes.

4. The nanodiamond dispersion composition according to claim 1, wherein the fatty acid ester dispersing agent has an acid value of 40 mgKOH/g or less.

5. The nanodiamond dispersion composition according to claim 1, wherein the nanodiamond particles has an average dispersed particle size from 2 to 240 nm.

6. The nanodiamond dispersion composition according to claim 1, wherein the nanodiamond dispersion composition has a haze value of 5 or less.

7. The nanodiamond dispersion composition according to claim 1, wherein the organic dispersion medium has an SP value from 6.0 to 12.0 $(cal/cm^3)^{1/2}$.

8. The nanodiamond dispersion composition according to claim 1, wherein the nanodiamond dispersion composition has a viscosity from 0.2 to 120 mPa·s at 25° C.

9. The nanodiamond dispersion composition according to claim 1, wherein the fatty acid ester dispersing agent has an average molecular weight Mp of 300 or greater.

10. The nanodiamond dispersion composition according to claim 1, wherein the nanodiamond particle contains a surface-modified nanodiamond in which a surface of a nanodiamond particle is modified by a group represented by Formula (I):

$$—X—R \qquad (I)$$

where X represents —Si—, —NH—, —O—, —O—C(═O)—, —C(═O)—O—, —NH—C(═O)—, —C(═O)—NH—, or —S—, and the bond extending to the left from X binds to the nanodiamond particle, and R represents a monovalent organic group, and an atom that binds to X is a carbon atom.

11. The nanodiamond dispersion composition according to claim 10, wherein X in Formula (I) represents —Si—, —NH—, —O—, or —O—C(═O)—.

12. The nanodiamond dispersion composition according to claim 1, wherein the fatty acid ester dispersing agent has an amine value of 5 mgKOH/g or less.

13. The nanodiamond dispersion composition according to claim 1, wherein the content of the fatty acid ester dispersing agent with respect to 100 parts by mass of a total amount of the nanodiamond particles in the nanodiamond dispersion composition is from 10 to 300 parts by mass.

14. The nanodiamond dispersion composition according to claim 1, wherein a content ratio of the fatty acid ester dispersing agent with respect to a total amount of a dispersing agent contained in the nanodiamond dispersion composition is 90 mass % or more.

15. The nanodiamond dispersion composition according to claim 10, wherein the monovalent organic group is a monovalent substituted or unsubstituted hydrocarbon group, a group in which a monovalent substituted or unsubstituted hydrocarbon group and an alkoxy group are bonded, or a group in which a monovalent substituted or unsubstituted hydrocarbon group and a dialkylamino group are bonded.

16. The nanodiamond dispersion composition according to claim 10, wherein a number of carbon atoms in the monovalent organic group is from 4 to 25.

17. The nanodiamond dispersion composition according to claim 10, wherein in Formula (I), X is —NH—, and R is a monovalent organic group containing from 8 to 20 carbon atoms.

18. The nanodiamond dispersion composition according to claim 10, wherein in Formula (I), R includes a hydrocarbon group having 4 or more carbon atoms in a straight chain.

19. The nanodiamond dispersion composition according to claim 10, wherein in Formula (I), a molar ratio of carbon atoms to a total amount of heteroatoms selected from the group consisting of nitrogen atoms, oxygen atoms, sulfur atoms, and silicon atoms is 4.5 or greater.

20. The nanodiamond dispersion composition according to claim 1, wherein the organic dispersion medium contains a lubricant base material, and a content of a solvent other than the lubricant base material with respect to 100 parts by mass of the total amount of the nanodiamond particles is less than 1000 parts by mass.

* * * * *